F. E. NORTON.
PROCESS OF SEPARATING MIXED GASES.
APPLICATION FILED OCT. 20, 1915. RENEWED JULY 29, 1919.
1,354,057.
Patented Sept. 28, 1920.
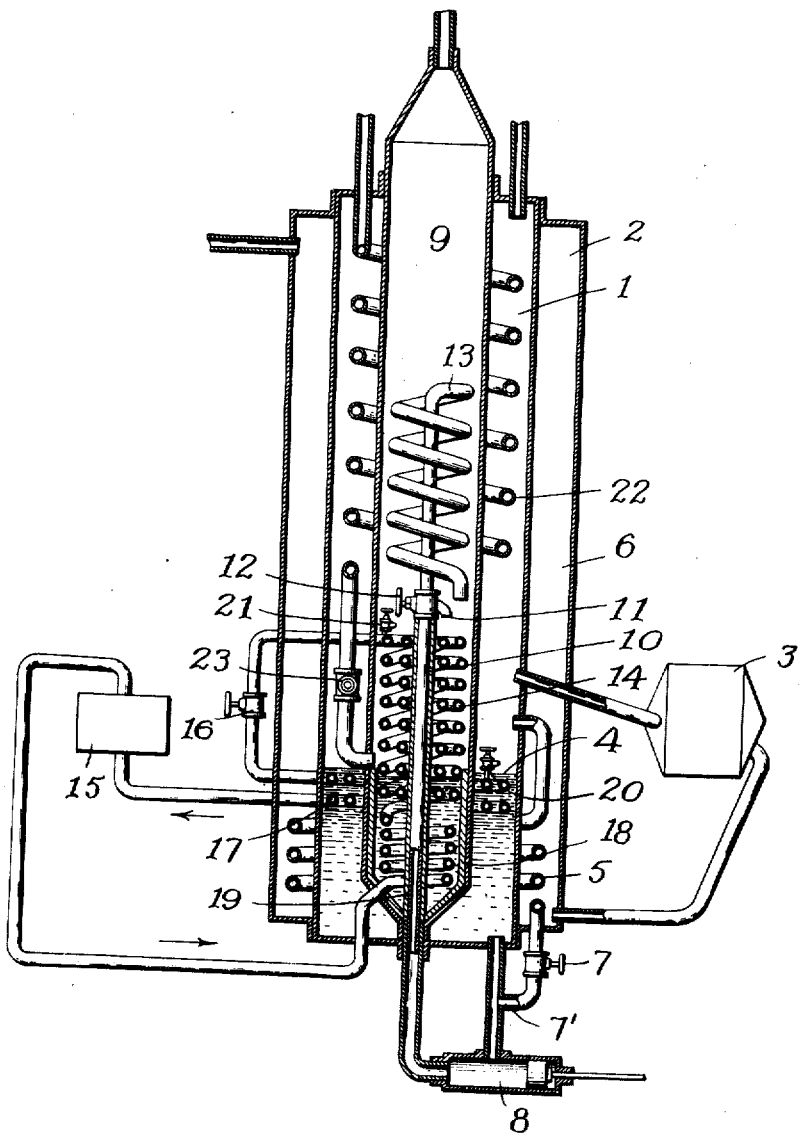
Witnesses.
R. D. Tolman.
Penelope Comberbach.
Inventor
Fred E. Norton.
By Geo. H. Kennedy Jr.
Attorney

UNITED STATES PATENT OFFICE.

FRED E. NORTON, OF WORCESTER, MASSACHUSETTS, ASSIGNOR TO JEFFERIES-NORTON CORPORATION, A CORPORATION OF DELAWARE.

PROCESS OF SEPARATING MIXED GASES.

1,354,057.     Specification of Letters Patent.     Patented Sept. 28, 1920.

Application filed October 20, 1915, Serial No. 56,987. Renewed July 29, 1919. Serial No. 314,163.

*To all whom it may concern:*

Be it known that I, FRED E. NORTON, a citizen of the United States, residing at Worcester, in the county of Worcester and Commonwealth of Massachusetts, have invented a new and useful Improvement in Processes of Separating Mixed Gases, of which the following, together with the accompanying drawing, is a specification.

The present invention relates in general to processes employed for the separation of mixed gases, such as air or water gas, into their constituent elements, and has particular reference to processes of this class which contemplate a partial separation of the components of the gas by liquefaction, and a complete separation by the progressive re-evaporation of the condensate, accompanied by rectification.

The process of the present invention contemplates the attainment of marked improvements in efficiency and capacity over distillation systems using the processes heretofore known; and in particular, the attainment of substantially absolute purity of the products of distillation ultimately drawn off, a result impossible of achievement in previously known processes, owing to inherent obstacles encountered in the practice of the same.

The principles of the invention, and the various steps employed in the application of said principles to the accomplishment of the desired results, are fully set forth in the following description, and in the annexed claims, reference being had to the accompanying drawing, in which the figure is a diagrammatic illustration of one arrangement of apparatus for carrying out said process.

It is to be understood, however, that the practice of my invention is not confined to the employment of the herein described, or any other particular arrangement of apparatus, nor to the herein described methods of utilizing such apparatus, except in so far as specified in the appended claims; the drawing being merely illustrative, and the description being confined, for the sake of clearness and brevity, to a single special case falling within the scope of the aforesaid principles.

The condensation of a mixed gas, as is well known, is characterized by the initial formation of a liquid much richer in the less volatile element of the mixture than the mixture itself, the vapor residue being correspondingly richer in the more volatile element of the mixture. Generally in prior processes of separation, this vapor residue, containing a high percentage of the more volatile element, is liquefied independently, and is used to rectify the products of evaporation from the aforesaid liquid mixture which contains a high percentage of the less volatile element. In general, the utilization of these two liquefied portions of the mixture in a rectifying column or still involves progressive contact between the ascending vapors from the mixed liquid which is rich in the less volatile element, and the descending liquid which is rich in the more volatile element, causing the descending liquid to exchange with the ascending vapors; whereby the liquid becomes richer in the less volatile element and the vapor becomes richer in the more volatile element, and progressively loses the less volatile component.

It is essential to processes operating on the above principle that the entire supply of the mixed gas be condensed; moreover, the external cooling agency, which in one form or another, is an essential element of all liquefaction systems, is called upon to extract large quantities of heat from a portion of the mixture, (namely that portion showing a high percentage of the more volatile element) at a temperature almost as low as the condensing point of the more volatile element, in order to liquefy the same. Energy, in the form of heat, must be supplied to the liquefied portion containing a high percentage of the less volatile element in order to evaporate the same, and this is usually accomplished by causing the said portion, rich in the less volatile element, to condense a portion of the partly cooled, incoming original mixture, which must, therefore, be under considerable pressure. In other words, in the ordinary systems, it is necessary to increase the pressure on the unseparated mixture until its boiling temperature is substantially as low as the boiling temperature of the less volatile element, under the pressure conditions prevailing in the still.

It is characteristic of such prior processes that the pressures on the descending liquid and ascending vapors in the still are equal; it is essential, moreover, that the temperature at the top of the rectifying column where the more volatile element is delivered, be maintained almost exactly at the extremely low boiling point of the more volatile element under the low pressure at which rectification is carried out, and if much higher; vaporization of the less volatile element will ensue at this point.

Almost exclusively, in such prior processes, the liquefaction of the mixture takes place under high pressure, and the rectification takes place after the pressure prevailing upon both portions of the liquefied mixture has been released. This release of pressure results in the reëvaporation of considerable amounts of both portions of the liquid and, therefore, imposes a serious limitation on the amount of gas capable of being handled by any given apparatus. This reevaporation also diminishes the purity of the product, since at the top of the rectifying column the outgoing more volatile element can not be drawn off without also taking with it some of the mixed evaporate produced by the release of pressure upon the liquid used for rectification.

According to the present invention, the inherent defects and difficulties above enumerated are overcome, by the utilization, in part, of the general principles involved in a process of separating mixed gases set forth and described in my copending application Serial No. 48,325, filed August 31, 1915. The present process, in common with the process described in the aforesaid copending application, contemplates the liquefaction of the mixed gas under relatively low pressure, and the distillation thereof under high pressure, thereby differing essentially from all prior processes. The present process differs from that described in the aforesaid copending application in that the rectification is performed by discharging the high pressure liquid at an intermediate point in the still, whence it descends in contact with vapors rising from previously discharged high pressure liquid, as hereinafter described; and furthermore, in the utilization of steps designed to insure the vaporization of the high pressure liquid by the heat extracted in condensing the low pressure fluid, thus affording a wider range of pressures between the incoming low pressure fluid, and the high pressure fluid undergoing rectification, whereby the fullest advantage may be taken of the heat absorbing properties of the latter, without imposing as great a duty upon the refrigerating engine or other form of external cooling agency ordinarily employed.

With reference to the application of these principles to the attainment of the objects hereinbefore mentioned, the diagrammatic illustration of one arrangement of apparatus for carrying out the process, as shown in the figure, together with the several steps constituting said process, will now be described.

Referring, by way of example, to the accompanying drawing, the mixed gas dealt with in the process, under relatively low compression, enters a passage 1 of a heat intercharger, designated as a whole by the numeral 2. By the action of said intercharger, in conjunction with a refrigerating engine 3 through which a portion of the gas in passage 1 may be drawn, a quantity of the mixed gas, in a liquid state, collects at 4 in the lower end of passage 1, as fully set forth in the process described in my copending application Serial No. 11,850, filed March 3, 1915. Obviously, the gas used in the refrigerating engine 3, or other external cooling agency may, if desired, be drawn from the passage 9, hereinafter referred to, of the heat interchanger, or the refrigerating engine may be contained in a wholly independent circuit. It will be clear that the liquid condensed at 4 will have a composition much higher in the less volatile element than the original mixture, and consequently a higher boiling point, pressure conditions being equal. It follows that the gas remaining uncondensed in passage 1 will have a higher percentage of the more volatile element than the original mixture and a boiling point above the boiling point of said more volatile element but below the boiling point of the original mixture.

If desired, another portion of this vapor residue, rich in the more volatile element of the mixed gas, may be withdrawn from the passage 1 into a coil 5 located within the cold end of another passage 6 of the interchanger, the flow of vapor through said coil being controlled by a valve 7; in coil 5 the said gas undergoes intense cooling by the action of the cold gases exhausted by the refrigerating engine 3, which are returned through said passage 6. The said gas in coil 5 is led into admixture at 7' with the liquid, rich in the less volatile element, condensed at 4, being drawn through said coil by the suction of a pump 8 acting on said liquid. This liquid has undergone subcooling by heat exchange with the cold exhaust gases from engine 3 in the passage 6, and attains a temperature approximately as low as the boiling point of a liquid rich in the more volatile element. Hence the resulting mixture handled by the pump reaches a composition much higher in the more volatile element than the mixture originally condensed at 4, for the reason that from the bubbles of vapor residue rising through the cold liquid from the point 7' the more volatile element will be condensed, said bubbles reaching the surface in the form of a vapor rich in the less volatile element and hence more easily condensed in the passage 1.

The mixture formed at the point 7', as above described, undergoes a considerable increase in pressure by the pump 8, which forces it into a third passage 9 of the interchanger, wherein such higher pressure is maintained, in any suitable manner, as by imposing a resistance against the outflow of vapor from said passage. The pressure prevailing in the passage 9 is obviously due to the resistance imposed against the outflow of vapor from the upper end of said passage; in forcing liquid into the bottom of this passage the pump 8 must put it under sufficient pressure to overcome the pressure prevailing therein, which, as above stated, is higher than the pressure prevailing in the passage 1.

The high pressure liquid mixture enters the passage 9 by means of a pipe or other equivalent device 10, which provides an outlet 11 for the liquid intermediate the ends of said passage at a level where the temperature within the interchanger corresponds approximately to the boiling point of the discharging liquid under the prevailing increased pressure. Or, if desired, the liquid in the pipe 10 may be diverted from the outlet 11 by means of a valve 12, and caused to pass through a coil 13 above the same, before discharging into the passage 9 at substantially the same level as said outlet.

In any case, the liquid, whether it be discharged from the coil 13 or from the outlet 11, flows downwardly in the passage 9, in contact with the exterior surface of a coil 14 therein, and collects at the lower end of said passage, as shown in the figure. The coil 14, which is partially submerged in the accumulated liquid in passage 9, constitutes part of a circulatory system for transferring the latent heat of condensation, extracted from the low pressure fluid in passage 1, in order to liquefy the same, to the high pressure liquid collected in the lower end of passage 9, in order to evaporate this liquid, according to the method set forth and described in my copending application, Serial No. 11,850, filed March 3, 1915.

In the present instance an independent fluid having a boiling point at the same or a lower temperature than the fluid to be condensed at the level 4, is forced into the lower submerged end of the coil 14 from a compressor 15 and passes from the upper end of said coil through an expanding nozzle 16, where its pressure is released. Thence the fluid circulates through a coil 17, immersed in the liquid occupying the lower end of passage 1, before returning to the suction side of compressor 15. The fluid passing to coil 17, after release of its pressure in nozzle 16 may be mostly liquid, as hereinafter set forth, and is very cold; in passing through coil 17 it condenses the fluid at the level 4 by extracting the latent heat of condensation therefrom and may be itself only partly evaporated in so doing. This resulting mixture of liquid and vapor from coil 17 passing to the compressor 15 has its pressure and temperature raised by said compressor. Passing thence in substantially gaseous form to the coil 14, it effects the evaporation of liquid at the surface in passage 9, by transfer of its heat thereto, and is itself condensed thereby, in whole or in part. The subsequent release of pressure on said circulating fluid in the nozzle 16, accompanied by cooling, causes its return to the coil 17 in condition to repeat the condensation at the surface 4, in the manner above described. The absorption and rejection of latent heat by the fluid used in the process and the independent circulating fluid, as described above, takes place under substantially constant temperature conditions and hence with the highest possible efficiency.

In the form of apparatus herein shown, it is necessary to provide suitable insulation 18, to prevent any heat interchange between the cold low pressure liquid in passage 1 and the high pressure liquid in passage 9, which latter, as previously stated, is maintained at a relatively high temperature, i. e., substantially that of the superheated high pressure circulating fluid in the coil 14. Insulation 19 must likewise be provided for the pipe 10, in order to prevent its subcooled contents from absorbing heat from the surrounding coil 14 and the liquid in passage 9.

It will be understood, with reference to the apparatus described above, for transferring the latent heat of condensation of the low pressure fluid to the high pressure liquid in passage 9, that my invention is not limited to the employment of the above described or any other form of apparatus for accomplishing this result. Furthermore, it is clear that the fluid used in the said heat transfer system may be the same fluid which is undergoing liquefaction, as fully set forth in my aforesaid copending application Serial No. 11,850; or, if desired, the apparatus herein shown and described may be operated, without deviation from the principles of the invention, by circulating a portion of the vapor residue in passage 1 through the system constituted by the coils 14 and 17, compressor 15 and expanding nozzle 16. To this end coil 17 may have a valved inlet 20 for the entrance of said vapor, which, after compression, may be discharged into the passage 9, through a valved outlet 21, located at a level in said passage where the percentage composition of the vapor therein corresponds to the percentage composition of said circulating vapor residue.

Assume, for example, that the gas treated in the process is air, having, as is well known, a composition of approximately 80 parts nitrogen, the more volatile element, and 20 parts oxygen, the less volatile element. The liquid discharging from the outlet 11 or from the coil 13, as the case may be, will have its temperature raised as it trickles over the surface of coil 14, due to the heat given up by the gas in the adjacent passage 1 of the interchanger, and also to the superheat of the high pressure transfer fluid within the coil 14. The consequent cooling of this transfer fluid, causing it to pass to the nozzle 16 as all liquid or nearly so, has previously been pointed out, and it will be clear that the contact of the descending cold liquid from pipe 10 with the unsubmerged portion of the coil 14 assists the operation of the latent heat transfer apparatus by extracting heat from the fluid in coil 14. As the descending liquid in passage 9 is warmed, its more volatile component, nitrogen, is gradually evaporated, and the liquid reaches the lower end of passage 9 as practically pure oxygen, and, of course, at a temperature approximately that of the boiling point of oxygen under the high pressure prevailing in this passage. The circulating fluid from the compressor 15, which is superheated at this stage in its cycle, is relied upon to furnish sufficient heat through the coil 14 to boil the rich oxygen liquid in the bottom of passage 9; in this manner, the superheat of the circulating fluid is largely absorbed, leaving only a very small part of the superheat of compression to be removed by the exhaust from refrigerating engine 3, or its equivalent.

As the rich oxygen liquid in passage 9 boils, it gives off whatever nitrogen is contained therein in vapor form, which rises past the unsubmerged part of coil 14; any oxygen vaporized at the same time is taken up by the liquid descending on the surface of said coil, replacing the nitrogen which said liquid gives off as it is warmed up during its descent. Consequently any vapor rising above the point of discharge 11 into the passage 9 must be substantially pure nitrogen, and the liquid in the bottom of said passage becomes, by boiling, pure oxygen. The presence of the subcooled coil 13 above the point of liquid discharge, when the liquid is diverted through this coil, insures the exit of absolutely pure nitrogen from the top of passage 9. That is, the liquid discharged from the coil 13 contains oxygen and nitrogen in about the same proportion as liquid air, owing to the addition of the vapor residue thereto as previously described, and at the level selected for its discharge as above set forth, said fluid is in a substantially neutral state, that is, substantially no vaporization occurs. The change of state incident to a slightly lower level or higher temperature in the still, or to any other cause, produces a vapor constituted by approximately 93 parts nitrogen and 7 parts oxygen. The rise of this vapor past the coil 13 results in the complete removal of the small oxygen content thereof by condensation of a portion of the vapor on the surface of the coil, since the liquid in the upper end of the coil is at a very low temperature due to the subcooling effect of the exhaust gases from the expansion engine 3 in the passage 6, before the increase in pressure on said liquid. For example, the liquid in passage 1 under atmospheric pressure may be thus subcooled to a temperature as low as 80° centigrade absolute; the pressure in the passage 9 may be twenty atmospheres, so that nitrogen, having a boiling point of approximately 117° centigrade absolute under 20 atmospheres pressure, as well as any trace of oxygen in the rising vapor would be condensed at the top of coil 13, within which a temperature of 80° centigrade absolute prevails. Obviously, the exhaust from the expansion engine 3 may be utilized to maintain as low a temperature as desired at the top of coil 13, in order to insure the complete purification of the escaping nitrogen vapor: the condensation at this point of nitrogen, which flows down the surface of the coil, completely removes the last traces of oxygen from the escaping vapor. On the other hand, in all previous distillation systems, the lowest temperature available at the point of final rectification of the more volatile component of the mixture, i. e., the temperature attained by the expansion of the condensed residue of initial condensation of the mixture, is still substantially higher than the boiling point, under released pressure, of said more volatile component.

Coincident with the production of pure nitrogen vapor at the top of the still, pure oxygen is formed at the other end of passage 9, by the distillation of the high pressure liquid which collects therein, and from which all traces of nitrogen are thus removed. This oxygen liquid may be evaporated, and withdrawn through a coil 22, thereby contributing to the cooling of the incoming mixture in passage 1. Or, if desired, the pressure on the oxygen vapor may be relieved, by a valve 23, before its use in the counter current apparatus.

With respect to the advantages incident to the employment of the above described process, over previously known processes, it will be clear that greater purity of the separated components of a mixed gas will be obtained, the greater the difference between the boiling temperatures of the more volatile and the less volatile elements. For example, in the separation of air by previously known processes, occurring at atmospheric pressure, the boiling point of oxygen is 90° centigrade absolute while the boiling point of nitrogen is 77.5° centigrade absolute, giving a difference of but 12.5°. But by the present system, under a pressure of 20 atmospheres in the still, there is a difference of 16.5° between the boiling point of nitrogen and the boiling point of oxygen, under such higher pressure.

It is to be understood that the process, as herein described, does not of necessity entail either the complete or the absolute liquefaction of the mixed gaseous fluid which is being separated, and that the terms "liquefaction", "liquid" and "liquefied", as used herein and in the appended claims, apply as well to a condition of the fluid where in density and temperature it substantially approaches the liquid state. In such a condition, said fluid, as will be clearly understood, is susceptible to a pressure increase by the expenditure of an almost negligible amount of power. The same, of course, holds true with respect to the changes in state undergone by the circulating latent heat transfer fluid which, corresponding substantially in density and in coldness to the fluid undergoing separation, is compressed by the expenditure of an amount of work which is exceedingly small in comparison to the work of cooling that would otherwise have to be expended in the external cooling agency to remove the latent heat.

In the application of the new principles underlying the present process, which differ radically and essentially from the principles underlying previous processes of this class, it is to be understood that my invention is in no sense limited to equivalents of the apparatus here shown, said showing being wholly diagrammatic and illustrative, and adopted solely for the purpose of simplifying the explanation of said broadly new principles.

I claim,

1. The herein described process of separating a mixed gas, comprising the liquefaction thereof, the increase of pressure on the liquid, the distillation of said liquid under increased pressure by the addition of latent heat extracted from the fluid undergoing liquefaction and the rectification of the products of distillation by means of said liquid.

2. The herein described process of separating a mixed gas, comprising the progressive liquefaction thereof, the addition of vapor residue to the liquid thus formed, the increase of pressure on the resulting liquid, the distillation of said resulting liquid under increased pressure by the addition of latent heat extracted from the fluid undergoing liquefaction and the rectification of the products of distillation by said resulting liquid.

3. The herein described process of separating a mixed gas, comprising the liquefaction thereof, the chilling of the liquid thus formed, the increase of pressure on the liquid, the distillation of said liquid under increased pressure by the addition of latent heat extracted from the fluid undergoing liquefaction and the rectification of the products of distillation by means of said liquid.

4. The herein described process of separating a mixed gas, comprising the progressive liquefaction thereof, the chilling of the liquid thus formed, the addition of vapor residue to the chilled liquid, the increase of pressure on the resulting liquid, the distillation of said resulting liquid under increased pressure by the addition of latent heat extracted from the fluid undergoing liquefaction and the rectification of the products of distillation by said resulting liquid.

5. In the herein described process of separating a mixed gas, the liquefaction of a portion of the mixture, under low pressure by the evaporation of another portion under higher pressure, and containing a higher percentage of the less volatile component of the mixture than said first portion.

6. In the herein described process of separating a mixed gas, the rectification of a mixed vapor under pressure by means of a fluid under pressure and having a temperature lower than the boiling point of the more volatile component of said vapor under the prevailing pressure.

7. In the herein described process of separating a mixed gas, the evaporation, under pressure, of each component of the mixed gas by means of the latent heat of condensation extracted from the original mixture under lower pressure.

8. The herein described process of separating a mixed gas, comprising the liquefaction thereof, and the raising of the temperature of the boiling point of the more volatile component of the gas, by increasing the pressure thereon, above the temperature of condensation of the original mixture.

9. The herein described process of separating a mixed gas, by liquefaction and distillation, comprising the extraction of latent heat from the gas to liquefy the same, by heat exchange with a circulating fluid, raising the pressure on the liquid thus formed, raising the pressure on said circulating fluid after such extraction, distilling said liquid under increased pressure by heat exchange with said circulating fluid, and rectifying the products of distillation by means of said liquid.

10. The herein described process of separating a mixed gas, by liquefaction and distillation, comprising the extraction of latent heat from the gas to liquefy the same, by heat exchange with a circulating fluid, raising the pressure on the liquid thus formed, raising the pressure on said circulating fluid after such extraction, distilling said liquid under increased pressure by heat exchange with said circulating fluid, reducing the pressure on said circulating fluid, and rectifying the products of distillation by means of said liquid.

11. The herein described process of separating a mixed gas, comprising the progressive liquefaction thereof, the increase of pressure on the liquid thus formed, the distillation of said liquid by means of a circulating fluid constituted by a portion of the vapor residue of progressive liquefaction, under an increased pressure, and the rectification of the products of distillation by means of said liquid.

12. The herein described process of separating a mixed gas, comprising the progressive liquefaction thereof, the increase of pressure on the liquid thus formed, the increase of pressure on a portion of the vapor residue of progressive liquefaction, the circulation of said portion in heat exchanging relation to the high pressure liquid, to distill the latter, the mixture thereof with the products of distillation, and the rectification of the vapor mixture thus formed by means of the liquid under said increased pressure.

13. The improvement in the art of separating mixed gaseous fluids, which consists in liquefying the fluid under pressure, distilling the liquid thus formed by the addition of latent heat extracted from the fluid undergoing liquefaction, and sustaining the pressure on the evaporate from said liquid during the entire process of separating same into its constituent elements.

14. In a process of the character set forth, the liquefaction, under pressure, of a mixed gaseous fluid, the evaporation of the liquid under pressure by the addition of latent heat extracted from the fluid undergoing liquefaction, and the rectification of said evaporate without releasing the pressure thereon.

Dated this fifteenth day of October, 1915.

FRED E. NORTON.

Witnesses:
PENELOPE COMBERBACH,
NELLIE WHALEN.

It is hereby certified that in Letters Patent No. 1,354,057, granted September 28, 1920, upon the application of Fred E. Norton, of Worcester, Massachusetts, for an improvement in "Processes of Separating Mixed Gases," errors appear in the printed specification requiring correction as follows: Page 2, line 7, after the word "higher" strike out the semicolon; same page, line 6, after the word "out" strike out the comma and insert a semicolon; and that the said Letters Patent should be read with these corrections therein that the same may conform to the record of the case in the Patent Office.

Signed and sealed this 30th day of November, A. D., 1920.

[SEAL.]

L. B. MANN,

*Acting Commissioner of Patents.*

Cl. 62—175.